United States Patent
Katsura

(10) Patent No.: US 11,480,295 B2
(45) Date of Patent: Oct. 25, 2022

(54) NOZZLE-TYPE STEAM TRAP

(71) Applicant: ECO FIRST Co., Ltd., Tokyo (JP)

(72) Inventor: Tsutomu Katsura, Tokyo (JP)

(73) Assignee: ECO FIRST CO., LTD., Tokyo (JP)

(*) Notice: Subject to any disclaimer, the term of this patent is extended or adjusted under 35 U.S.C. 154(b) by 260 days.

(21) Appl. No.: 15/009,280

(22) Filed: Jan. 28, 2016

(65) Prior Publication Data

US 2016/0146399 A1 May 26, 2016

Related U.S. Application Data

(63) Continuation-in-part of application No. PCT/JP2014/070163, filed on Jul. 31, 2014.

(30) Foreign Application Priority Data

Aug. 2, 2013 (JP) .............................. JP2013-161493
May 30, 2014 (JP) .............................. JP2014-112882

(51) Int. Cl.
*F16T 1/12* (2006.01)
*B01D 35/02* (2006.01)
*F16T 1/34* (2006.01)

(52) U.S. Cl.
CPC ................ *F16T 1/12* (2013.01); *B01D 35/02* (2013.01); *F16T 1/34* (2013.01)

(58) Field of Classification Search
CPC ....... F16T 1/12; F16T 1/16; F16T 1/34; F16T 1/165; Y10T 137/3003; Y10T 137/3021;

(Continued)

(56) References Cited

U.S. PATENT DOCUMENTS 1,273,656 A * 7/1918 Paget ..................... B01D 35/02
                                                                210/310
1,950,227 A * 3/1934 Chevalier ................. F16T 1/34
                                                                137/177

(Continued)

FOREIGN PATENT DOCUMENTS

JP          8-278000 A     10/1996
JP          11-90126 A      4/1999

(Continued)

OTHER PUBLICATIONS

Extended European Search Report issued by the European Patent Office dated Nov. 2, 2017 for European Patent Application No. 14832768.7.

(Continued)

*Primary Examiner* — Craig J Price
(74) *Attorney, Agent, or Firm* — Manatt, Phelps & Phillips, LLP

(57) ABSTRACT

This Venturi nozzle steam trap comprises a body, a strainer, a drain reservoir, and a Venturi nozzle, characterized in that the drain reservoir includes a drain vent of the Venturi nozzle and a non-drain vent, and is disposed in an upper section of a vapor transport piping structure provided with the steam trap, the drain vent is placed in a position lower than the non-drain vent, and a height difference between the drain vent and the non-drain vent is continuously varied by using a rotatable components on the same axis as that of the vapor transport piping structure.

3 Claims, 20 Drawing Sheets

(58) Field of Classification Search
CPC ............. Y10T 137/304; Y10T 137/794; Y10T 137/7976; Y10T 137/8013; Y10T 137/8049; Y10T 137/8085; B01D 35/02
USPC ....... 137/171, 177, 183, 544, 545, 546, 547, 137/549; 55/466; 236/56–59, 94, 43, 236/93 R, 101 B
See application file for complete search history.

(56) References Cited

U.S. PATENT DOCUMENTS

| | | | | |
|---|---|---|---|---|
| 1,992,472 | A * | 2/1935 | Craig | B01D 35/02 165/119 |
| 2,020,563 | A | 11/1935 | Moore | |
| 2,328,986 | A * | 9/1943 | McKee | F16T 1/16 137/183 |
| 2,636,506 | A * | 4/1953 | St Clair | F16L 55/07 137/177 |
| 2,988,101 | A * | 6/1961 | Mueller | F16T 1/165 137/183 |
| 3,162,208 | A * | 12/1964 | Curatola | F16T 1/165 137/183 |
| 3,724,751 | A * | 4/1973 | Fujiwara | F16T 1/165 137/183 |
| 4,073,306 | A * | 2/1978 | Neyer | F16T 1/12 137/183 |
| 4,134,541 | A * | 1/1979 | Beatty | F16T 1/02 137/182 |
| 4,171,209 | A * | 10/1979 | Brown | B01D 46/10 138/41 |
| 4,288,032 | A * | 9/1981 | Hetz | F16T 1/10 137/183 |
| 4,387,732 | A * | 6/1983 | Hetz | F16T 1/10 137/183 |
| 4,426,213 | A | 1/1984 | Stavropoulos | |
| 4,541,456 | A | 9/1985 | Troy | |
| 4,592,381 | A * | 6/1986 | Troy | F16T 1/34 137/183 |
| 4,745,943 | A | 5/1988 | Mortensen | |
| 5,060,686 | A | 10/1991 | Troy | |
| 5,120,336 | A | 6/1992 | LeBlanc | |
| 5,123,452 | A | 6/1992 | LeBlanc | |
| 5,137,556 | A * | 8/1992 | Koulogeorgas | B01D 46/0017 137/549 |
| 5,230,366 | A * | 7/1993 | Marandi | G05D 7/01 137/549 |
| 5,429,150 | A | 7/1995 | Siefers | |
| 5,628,339 | A | 5/1997 | Isringhausen | |
| 6,138,706 | A * | 10/2000 | Brint | F16T 1/48 137/183 |
| 6,148,845 | A * | 11/2000 | Borowski | F16T 1/38 137/183 |
| 6,719,900 | B2 * | 4/2004 | Hawkins | B01D 29/118 210/248 |
| 8,950,421 | B2 * | 2/2015 | Joe | F15B 21/048 137/195 |
| 9,121,549 | B2 * | 9/2015 | Mawby | F16T 1/34 |
| 9,303,817 | B2 * | 4/2016 | Feltgen | F04B 39/16 |
| 9,377,129 | B2 * | 6/2016 | Schlensker | F16T 1/14 |
| 9,500,102 | B2 * | 11/2016 | Lee | F16T 1/383 |
| 2009/0044868 | A1 * | 2/2009 | Chiang | F16T 1/38 137/183 |

FOREIGN PATENT DOCUMENTS

| | | |
|---|---|---|
| JP | 11-90127 A | 4/1999 |
| JP | 2002-257287 A | 9/2002 |
| JP | 2002-310392 A | 10/2002 |
| JP | 2004-162866 A | 6/2004 |
| JP | 2004-190827 A | 7/2004 |
| JP | 2004-218724 A | 8/2004 |
| JP | 2004-230305 A | 8/2004 |
| JP | 2008-309290 A | 12/2008 |
| JP | 2010-65825 A | 3/2010 |
| JP | 2010-156450 A | 7/2010 |

OTHER PUBLICATIONS

First Office Action issued by the Japan Patent Office dated Nov. 25, 2014 for Japanese Patent Application No. 2014-546226.
First Office Action issued by the State Intellectual Property Office of the People's Republic of China dated Aug. 29, 2017 for China Patent Application No. 201480043557.1.
Second Office Action issued by the State Intellectual Property Office of the People's Republic of China dated Mar. 14, 2018 for China Patent Application No. 201480043557.1.

* cited by examiner

NOZZLE-TYPE STEAM TRAP

RELATED APPLICATIONS

This application is a continuation-in-part application of, and claims priority to, International Application No. PCT/JP2014/070163 (international publication WO/2015/016298) filed Jul. 31, 2014, which in turn claims priority to Japanese patent application No. JP2014-112882 filed May 30, 2014 and JP2013-161493 filed Aug. 2, 2013. All of the above applications are hereby incorporated herein by reference in their entirety.

TECHNICAL FIELD

The present invention relates to nozzle-type steam traps, including Venturi nozzle-type, orifice nozzle-type and/or tunnel-structured resistance tube-type steam traps for automatically and continuously discharging drain (steam condensate resulting from the condensation of steam) arising in steam-based equipment and a vapor transport piping system installed among these equipment out of the system in a variety of facilities, including factories and offices, which use steam as a heat source through a heat exchanger.

BACKGROUND ART

A large number of steam traps are used in a variety of facilities, including factories and offices, which use steam as a heat source through a heat exchanger, in order to automatically discharge condensate arising in steam-based equipment and a vapor transport piping system installed among these equipment out of the system.

This is for the purpose of securing suitable temperature conditions in steam-based equipment, including heating machines, drying machines and heaters, which use high-temperature and high-pressure steam obtained with a boiler at a heat exchange unit and in a vapor transport piping system that connects the boiler and the steam-based equipment. If, for example, condensate stays in steam-based equipment, the heating efficiency of the equipment degrades, thus significantly decreasing the productivity of the equipment. In addition, heating unevenness due to condensate droplets can be a cause for the quality failure of products and impairs the stable operation of factories. Yet additionally, condensate staying within the vapor transport piping system can be a cause for the occurrence of extremely dangerous steam hammering and may impair the safe operation of factories. This steam hammering refers to a phenomenon in which condensate staying within the vapor transport piping system forms a large chunk while being washed away by a steam, and the large chunk of condensate collides with curved portions of pipes and valves. The steam hammering also refers to a phenomenon in which if condensate staying within the vapor transport piping system comes into contact with steam, the steam condenses all at once, the volume of the steam reduces to zero, and the condensate rushes to and collides with a location where a vacuum state is formed locally.

Conventionally, there have been used mechanical engineering-based mechanical steam traps (bucket-type and float-type steam traps), thermostatic steam traps (bimetal-type and bellows-type steam traps), and thermodynamic steam traps (disc-type steam traps).

These mechanical steam traps including movable portions are basically drain valve mechanisms. These steam traps repeat a series of actions in which when a certain amount of condensate accumulates, the condensate is discharged by opening a drain valve, and then the drain valve is closed immediately. Accordingly, these steam traps suffer severe steam leakage caused by damage to movable portions due to operating delays or repetitive actions and remarkably consume steam. In addition, the intermittent drainage of a steam trap including a movable portion does not assure the stable operation of steam-based equipment. Hence, the abovementioned mechanical steam traps have been brought under review from the viewpoint of, for example, the high-efficiency and energy-saving operation and the $CO_2$ reduction of factories.

Among other things, nozzle-type steam traps as typified by the orifice nozzle-type, Venturi nozzle-type and tunnel-structured resistance tube-type steam traps are a focus of attention. These steam traps are called fluidics-based steam traps and take advantage of the nature in which water is lower in kinetic viscosity than steam when passing through a microstructural passage and an amount of water approximately 30 times the amount of steam flows the passage. As typical examples, FIGS. 1 to 4 illustrate conventional Venturi nozzle-type steam traps. As is evident from the figures, the steam traps are structured so as not to include any movable portions where condensate passes through the microstructural passage of a Venturi nozzle 3. Unlike the abovementioned mechanical steam traps, the Venturi nozzle-type steam traps are less liable to steam leakage and realize continuous drainage on the basis of such a drainage mechanism and a drainage structure as described above. Consequently, the fuel use of a boiler is significantly decreased, thereby enabling steam-based equipment to be stably operated. In addition, the structure free from movable portions is superior in durability and has the characteristic that maintenance and inspection are easy to carry out. Yet additionally, the structure is resistant to steam hammering and freezing and is also superior in stability and safety.

For such a reason as described above, there have been recognized a large number of proposals related to the abovementioned fluidics-based steam traps, the orifice nozzle-type and Venturi nozzle-type steam traps in particular. Examples of proposals for the orifice nozzle-type steam traps include Japanese Patent Laid-Open No. 2002-310392, Japanese Patent Laid-Open No. 2004-162866, Japanese Patent Laid-Open No. 2004-190827, Japanese Patent Laid-Open No. 2004-218124, and Japanese Patent Laid-Open No. 2008-309290. Examples of proposals for the Venturi nozzle-type steam traps include U.S. Pat. Nos. 4,426,213, 4,745,943, 5,060,686, 5,123,452, 5,429,150, and 5,628,339. All of the above published applications and patents are hereby incorporated herein by reference in their entirety.

In the orifice nozzle-type, Venturi nozzle-type, and tunnel-structured resistance tube-type steam traps, however, condensate serves as a sealing material. Accordingly, a drain vent 10 of a Venturi nozzle 3 connecting from the inlet of a body 1 through a strainer is formed in a position lower than the position of a non-drain vent 11 connecting to the outlet of the body and fixed, as illustrated in FIG. 2, in the case of, for example, Venturi nozzle-type steam traps.

A method of exchanging a nozzle for another different in diameter and length has therefore been adopted in the case of the abovementioned nozzle-type steam traps, in order to cope with a change in the discharged amount of condensate due to, for example, a variation in the amount of steam used resulting from seasonal external factors or the operating condition of steam-based equipment or a variation in the working pressure difference between the abovementioned inlet and outlet. Such a method has the problem, however, in which the range of the abovementioned change in the discharged amount of condensate that the method can cope with is limited, in spite of the method's high workload. In contrast, a mechanism for exchanging an orifice diameter for another by means of rotation according to the amount of condensate (Japanese Patent Laid-Open No. 2004-218724) and a mechanism in which the passageway length of an orifice is variable (Japanese Patent Laid-Open No. 2002-310392) have been proposed in the case of, for example, orifice nozzle-type steam traps.

That is, the abovementioned conventional nozzle-type steam traps have a first problem in which adjustments following a change in the amount of drainage are difficult to make and the range of changes to be coped with is limited.

On the other hand, the abovementioned nozzle-type steam traps have the problem in which since the diameter of a nozzle that condensate passes through is small, pipes are liable to become clogged with foreign matter, such as rust or dust. Accordingly, as is understood from FIG. 3, a foreign matter-removing device referred to as a strainer 5 provided with a screen 6 for purifying fluid itself has been placed before a nozzle (see, for example, Japanese Patent Laid-Open No. 2002-257287, Japanese Patent Laid-Open No. 2004-230305, Japanese Patent Laid-Open No. 2008-309290, U.S. Pat. Nos. 4,745,943, and 5,120,336, all of which are hereby incorporated by reference herein in their entirety). It has become increasingly clear, however, that a screen having a microscopic opening needs to be applied. For example, whereas a 60-mesh or coarser screen is used in U.S. Pat. Nos. 4,745,943 and 5,120,336, an 80 to 100-mesh screen is used in Japanese Patent Laid-Open No. 2010-156450. Rigidity degrades extremely along with the microstructuring of screens, however, thus making it extremely difficult to retain the form of a screen itself and attach/detach and clean the screen. Notwithstanding the difficulty, only one end of the nozzle side (drain outlet side) of a screen is simply fixed by a welding method, a screw-in method, or the like, in consideration of the maintenance of a strainer, such as screen cleaning. For such a problem as described above, Japanese Patent Laid-Open No. 2004-230305 discloses reinforcement with a grip or a metal plate having small holes. The patent document neither includes any descriptions with regard to the removal of foreign matter and flow rates, nor specifically proposes a solution to the above-described problem.

On the other hand, a study has been made on a contrivance for removing foreign matter trapped in an orifice by adopting an up-down movable orifice, as in Japanese Patent. Laid-Open No. 2008-309290.

As described above, the abovementioned nozzle-type steam traps have a second problem in which rigidity degrades along with the miniaturization of screen meshes, thus making it difficult to retain the form of a screen itself and handle the screen for attachment/detachment or cleaning.

CITATION LIST

Patent Literature

Patent Literature 1: Japanese Patent Laid-Open No. 2002-310392
Patent Literature 2: Japanese Patent Laid-Open No. 2004-162866
Patent Literature 3: Japanese Patent Laid-Open No. 2004-190827
Patent Literature 4: Japanese Patent Lard-Open No. 2004-218724
Patent Literature 5: Japanese Patent Laid-Open No. 2008-309290
Patent Literature 6: U.S. Pat. No. 4,426,213
Patent Literature 7: U.S. Pat. No. 4,745,943
Patent Literature 8: U.S. Pat. No. 5,060,686
Patent Literature 9: U.S. Pat. No. 5,123,452
Patent Literature 10: U.S. Pat. No. 5,429,150
Patent Literature 11: U.S. Pat. No. 5,628,339
Patent Literature 12: Japanese Patent Laid-Open No. 2002-257287
Patent Literature 13: Japanese Patent Laid-Open No. 2004-230305
Patent Literature 14: U.S. Pat. No. 5,120,336
Patent Literature 15: Japanese Patent Laid-Open No. 2010-156450, all of which are hereby incorporated by reference herein in their entirety.

SUMMARY OF INVENTION

Technical Problem

For the above-described first problem, the present invention is intended to provide an orifice nozzle-type steam trap, a Venturi nozzle-type steam trap, and a tunnel-structured resistance tube-type steam trap including a drainage volume adjusting mechanism capable of coping with a change in the discharged amount of condensate due to, for example, a variation in the amount of steam used resulting from the operating condition of steam-based equipment, seasonal external factors or a variation in the working pressure difference between the inlet and outlet of a steam trap. In addition, for the second problem, the present invention is intended to provide a strainer filter that eliminates rigidity insufficiency due to the microstructuring of a strainer screen, retains the form of the screen, allows the screen to be easily attached to and detached from a strainer, and makes maintenance, such as screen cleaning, easy, and an orifice nozzle-type steam trap, a Venturi nozzle-type steam trap and a tunnel-structured resistance tube-type steam trap including the drainage volume adjusting mechanism provided with the strainer filter. Here, means for removing foreign matter from a fluid itself to purify the fluid is referred to as a screen, and a component that uses this screen to remove foreign matter from a fluid itself to purify the fluid, as in the present invention, is referred to as a filter.

Solution to Problem

In order to solve the first problem of the related art, a nozzle-type steam trap of the present invention is provided with a drainage volume adjusting mechanism having a piping structure in which the height difference between a drain vent through which condensate is discharged into a drain reservoir disposed in the steam trap and a non-drain vent through which condensate is discharged from the drain reservoir to the outer side of a steam trap can be varied by means of a rotational mechanism.

In particular, the steam trap can be simplified and downsized by disposing the drain reservoir, the drain vent and the non-drain vent in the upper section of the steam trap or by rotatably connecting a pipe provided with the drain reservoir and a pipe in which the non-drain vent is disposed inside a cross-sectional area of the reservoir on the same axis as the above-described piping structure.

On the other hand, the discharged amount of condensate of the steam trap can be unlimitedly adjusted by rotatably connecting a pipe provided with the drain reservoir and a pipe in which the non-drain vent is disposed outside a cross-sectional area of the reservoir on the same axis as the above-described piping structure. An existing nozzle-type steam trap can thus be used as is.

In addition, the nozzle-type steam trap of the present invention is vertically piped and provided with a drainage volume adjusting mechanism capable of switching between a piping structure in which condensate discharged from a drain vent is ejected out of a steam trap system in a free-fall state and a piping structure in which condensate is ejected out of the steam trap system from a location higher than the drain vent.

In order to solve the second problem of the related art, a strainer filter of the present invention includes a support body for reinforcing the rigidity of the screen disposed on the inner side and/or the outer side of a screen attached to a strainer.

In particular, the strainer filter of the present invention is made of corrosion-resistant metal, the support body for reinforcing the strainer filter is made of a spring material, and the screen and the support body are joined together, coupled with each other, screwed together, engaged with each other, sewn together, or mated with each other.

Alternatively, the strainer filter of the present invention is a screen made of heat-resistant fiber, the support body for reinforcing the strainer filter is made of a spring material, and the screen and the support body are joined together, coupled with each other, screwed together, engaged with each other, sewn together, or mated with each other.

Advantageous Effects of Invention

According to a nozzle-type steam trap including the drainage volume adjusting mechanism of the present invention, it is possible to easily adjust and optimize the discharged amount of condensate for a change in the discharged amount of condensate due to a variation in the amount of steam used or working pressure, while maintaining advantages that orifice nozzle-type, Venturi nozzle-type and tunnel-structured resistance tube-type steam traps have, without having to exchange an orifice nozzle, a Venturi nozzle, or a tunnel-structured resistance tube for another.

On the other hand, according to the strainer filter of the present invention, the form of the screen is retained and the filter can be easily attached to and detached from the strainer, thus making maintenance, such as filter cleaning, easy. In addition, the size of the strainer filter can be freely adjusted, independent of the size of the strainer.

Using the falter the screen of which is reinforced with the support body in the strainers of the orifice nozzle-type, Venturi nozzle-type and tunnel-structured resistance tube-type steam traps including the drainage volume adjusting mechanism, it is possible to provide a nozzle-type steam trap significantly improved in the workability of nozzle replacement and filter replacement.

DESCRIPTION OF EMBODIMENTS

Hereinafter, embodiments of the present invention will be described by citing a Venturi nozzle-type steam trap as a typical example, while referring to the accompanying drawings. The present invention is also applied, however, to orifice nozzle-type and tunnel-structured resistance tube-type steam traps capable of continuous drainage. In addition, the present invention is not limitative, except as set forth in the technical scope defined by the appended claims.

Figure 5:
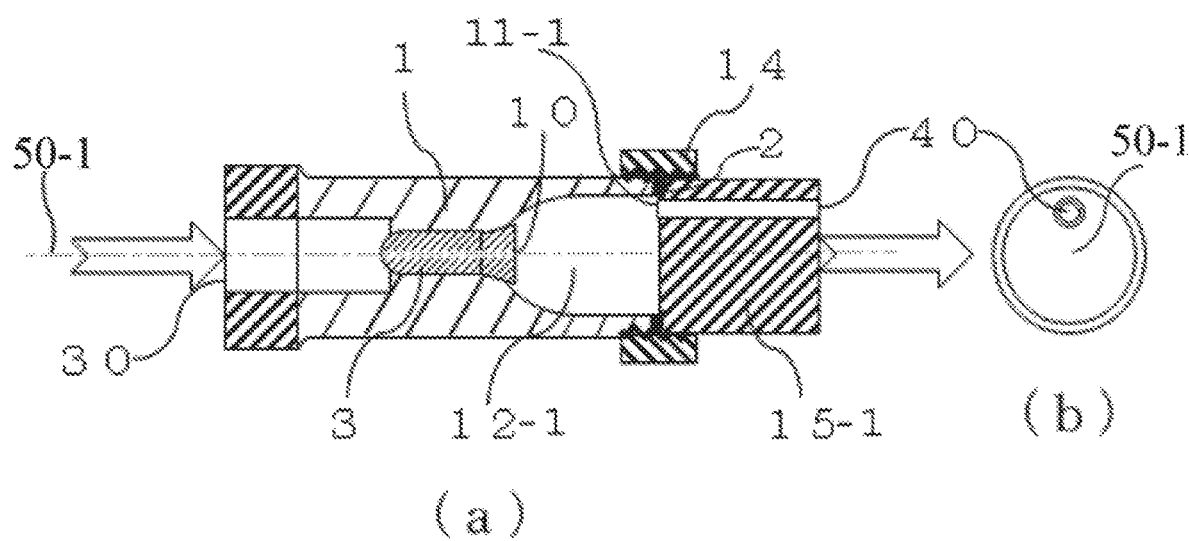
FIG. 5 illustrates a first embodiment of the present invention, where (a) of FIG. 5 is a cross-sectional view and (b) of FIG. 5 is a side view of a Venturi nozzle-type steam trap in which a drainage volume adjusting component is introduced using a union.

(a) of FIG. 5 is a cross-sectional view of a Venturi nozzle-type steam trap according to a first embodiment of the present invention. As is evident from the figure, a drainage volume adjusting component 15-1 in which the position of a non-drain vent 11-1 is continuously variable with respect to a drain vent 10 of a Venturi nozzle 3 is disposed in the steam trap using a union 14. As is evident from the cross-sectional view ((a) of FIG. 5) and the side view ((b) of FIG. 5), this steam trap is fabricated by forming the non-drain vent 11-1 inside an cross-sectional area of a drain reservoir 12-1 and connecting a pipe including the drain reservoir 12-1 and a pipe provided with the non-drain vent 11-1 by means of a union, a flange or the like rotatable on the same axis 50-1. Accordingly, the height difference between the drain vent 10 and the non-drain vent 11-1 can be controlled freely. It is therefore possible to adjust and optimize the discharged amount of condensate for a change in the discharged amount of condensate due to the amount of steam used or the variation of working pressure, without having to exchange an orifice nozzle, a Venturi nozzle, or a tunnel-structured resistance tube for another. In addition, the steam trap of the present embodiment has the advantage of being simple and small.

Figure 2:
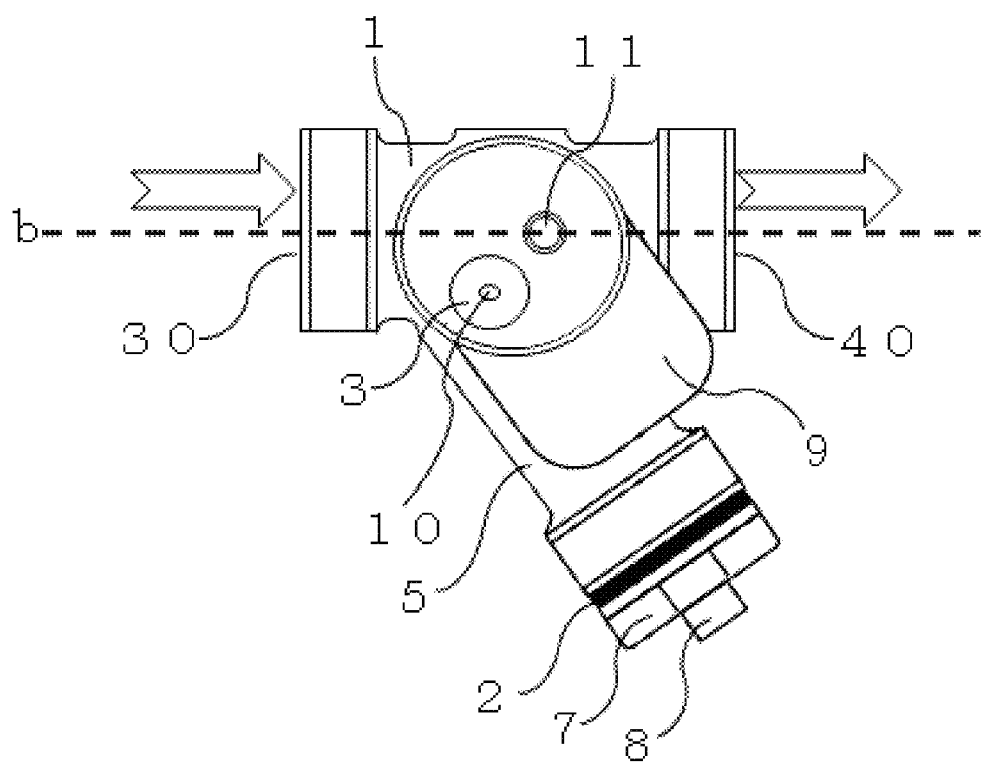
FIG. 2 shows a front view of the conventional Venturi nozzle-type steam trap from which an end cap is removed.
Figure 6:
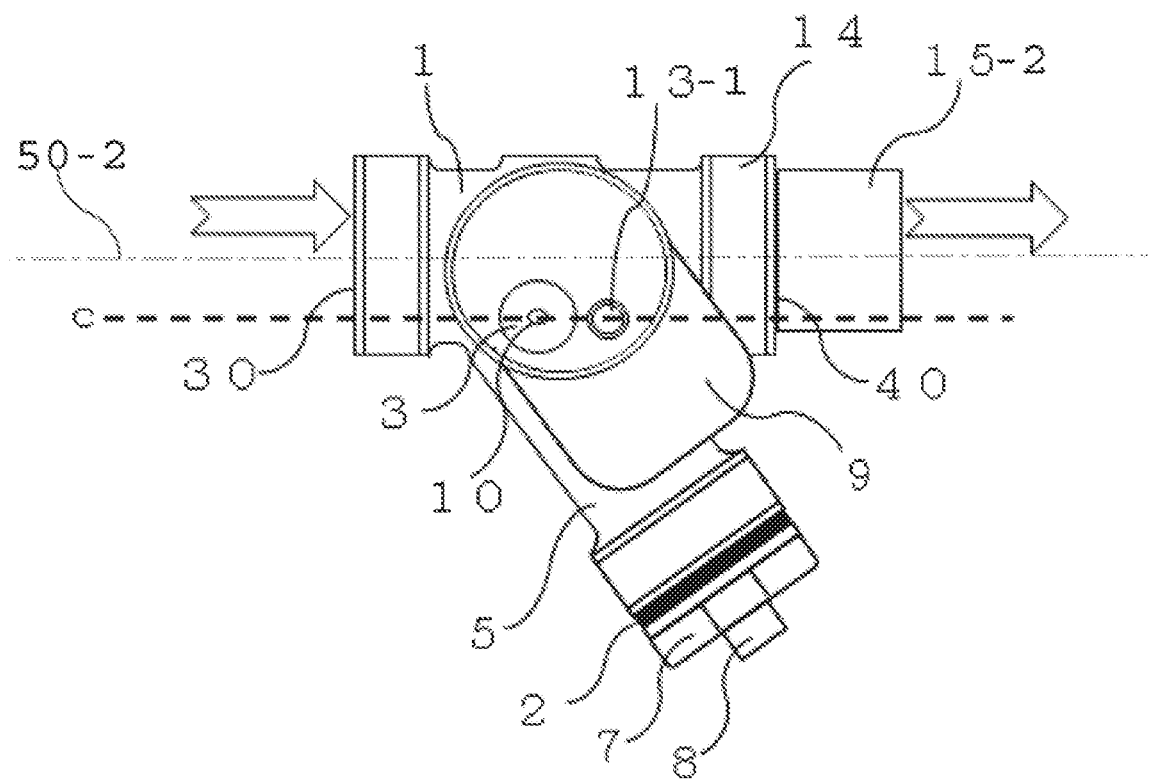
FIG. 6 illustrates second and third embodiments of the present invention and is a front view of a Venturi nozzle-type steam trap which is configured by introducing a drainage volume adjusting component in a conventional Venturi nozzle-type steam trap using a union and from which an end cap is removed.

FIGS. 6 to 9 illustrate a Venturi nozzle-type steam trap according to a second embodiment of the present invention. This steam trap is characterized by additionally attaching a drainage volume adjusting component 15-2 to the conventional Venturi nozzle-type steam trap illustrated in FIG. 2. The drain vents 10 of the Venturi nozzles illustrated in FIGS. 2 and 6 are the same, but the non-drain vent 11 illustrated in FIG. 2 serves as an intra-drain reservoir conduction port 13-1 (conventional non-drain vent 11) for circulating condensate throughout the reservoir 12-2 in FIGS. 6 to 9. In addition, the non-drain vent 11 illustrated in FIG. 2 is disposed in the drainage volume adjusting component 15-2 in FIGS. 6 to 9. This drainage volume adjusting component 15-2 is connected to the body 1 on the same axis 50-2 using a rotatable union, flange or the like, so that the height difference between the drain vent 10 and the non-drain vent 11-2 is continuously variable.

Figure 7:
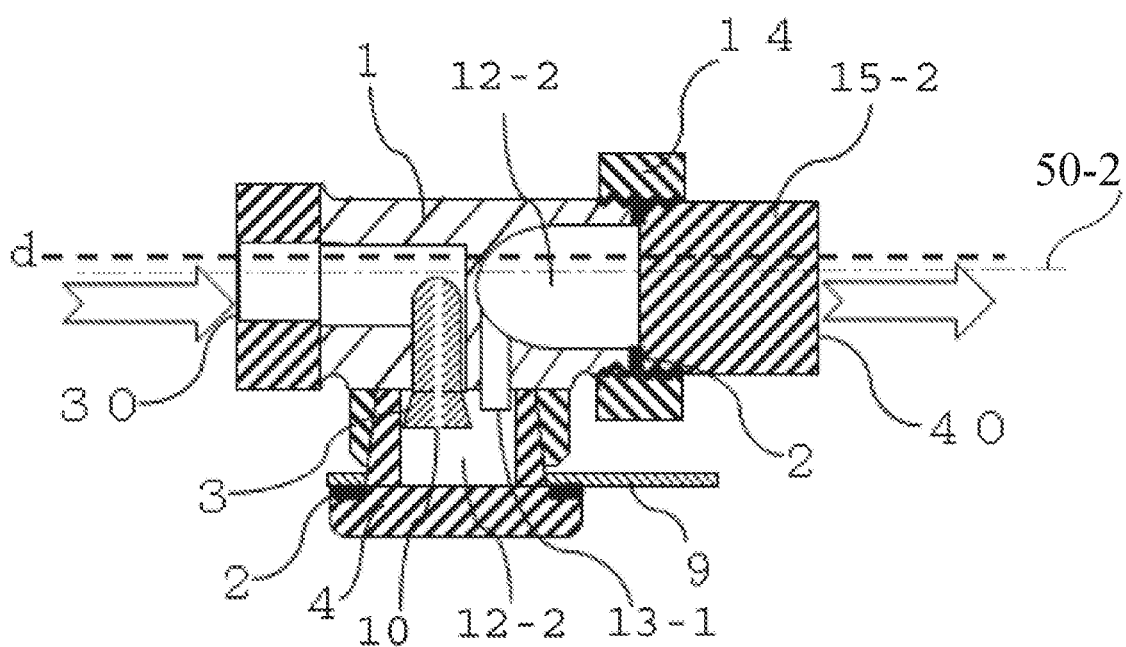
FIG. 7 illustrates the second and third embodiments of the present invention and is a cross-sectional view taken by cutting the steam trap vertically to the page on a dashed line c in FIG. 6.
Figure 8:
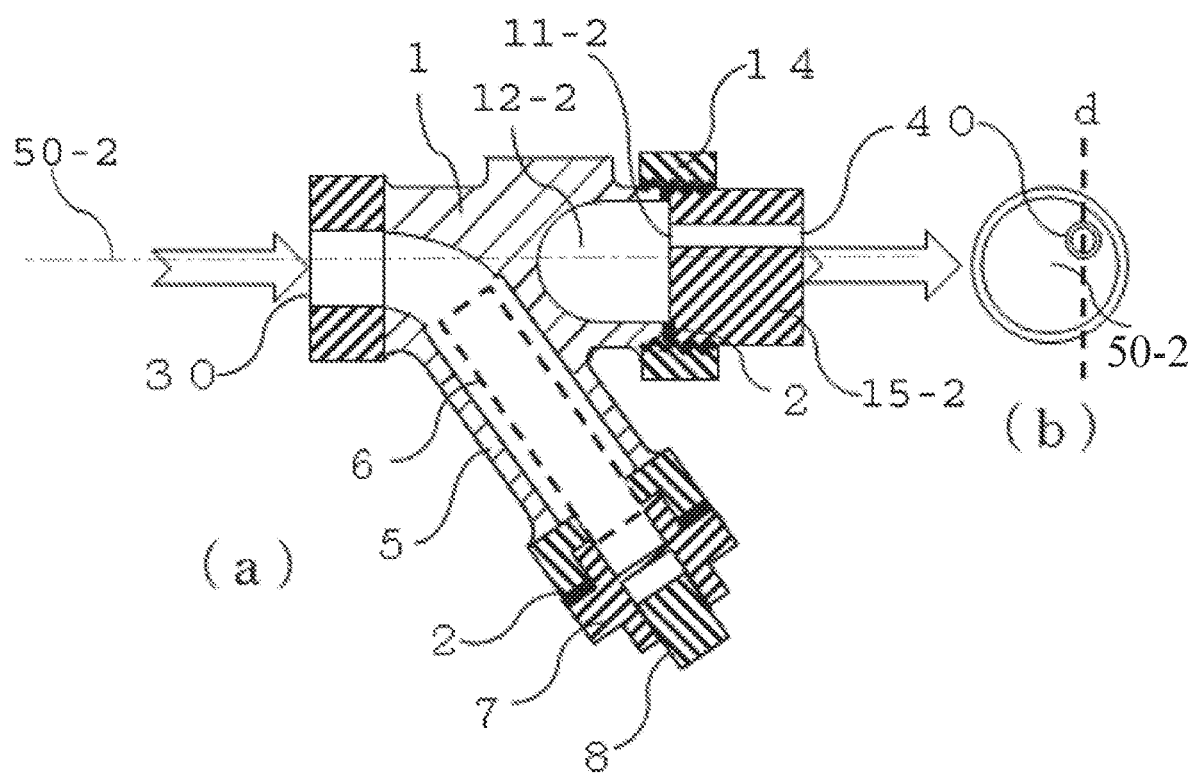
FIG. 8 illustrates the second embodiment of the present invention which is a Venturi nozzle-type steam trap characterized by disposing a pass-through slot serving as a non-drain vent in the drainage volume adjusting component of FIG. 6. (a) of FIG. 8 is a cross-sectional view taken by cutting the steam trap vertically to the page on a dashed line d in FIG. 7, whereas (b) of FIG. 8 is a side view of the steam trap, in a case where the non-drain vent is located in the uppermost section of the drainage volume adjusting component.
Figure 9:
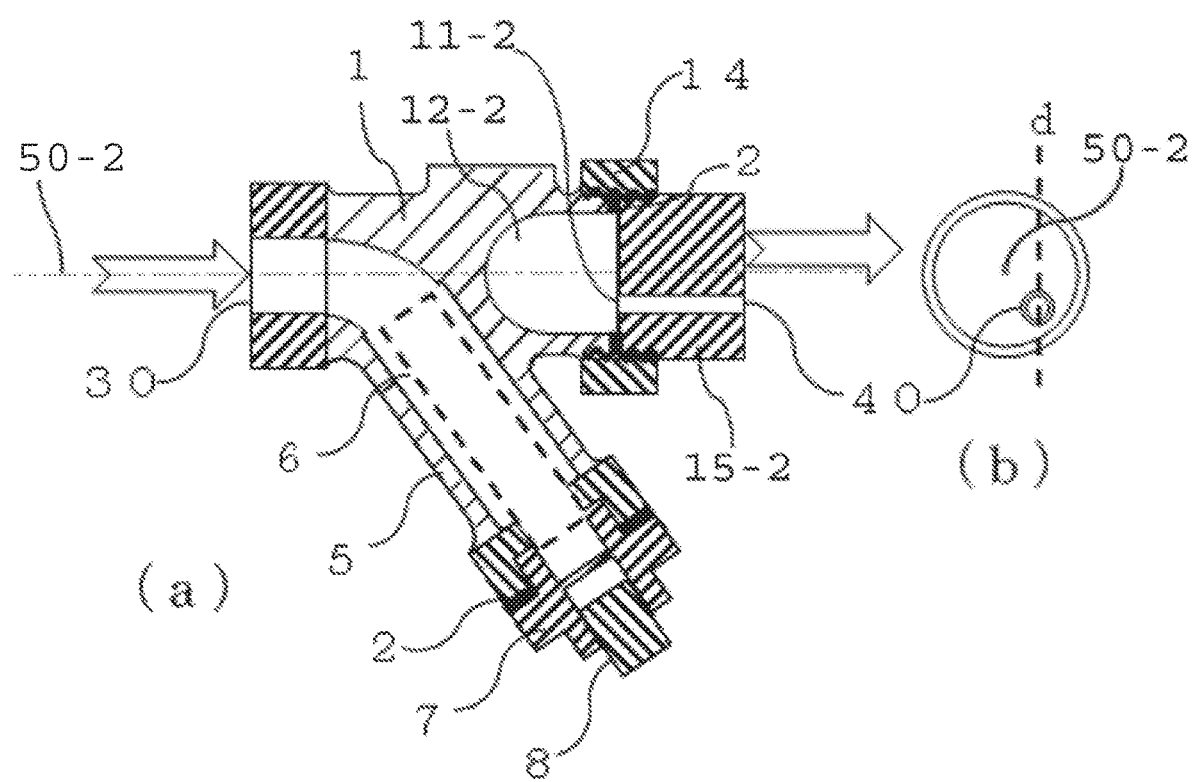
FIG. 9 illustrates the second embodiment of the present invention which is a Venturi nozzle-type steam trap characterized by disposing a pass-through slot serving as a non-drain vent in the drainage volume adjusting component of FIG. 6. (a) of FIG. 9 is a cross-sectional view taken by cutting the steam trap vertically to the page on a dashed line d in FIG. 7, whereas (b) of FIG. 9 is a side view of the steam trap, in a case where the non-drain vent is located in the lowermost section of the drainage volume adjusting component.

As is evident from FIGS. 7 to 9, the conventional non-drain vent 11 serves as the intra-drain reservoir conduction port 13-1 for connecting drain reservoirs 12-2 in two places, and therefore, the tolerable capacity of the drain reservoirs 12-2 increases. Thus, it is possible to widen the range of application with regard to a variation in the amount of steam used, a variation in the working pressure difference or the like that differs depending on facilities. In addition, the second embodiment has the advantage of being able to use a conventional Venturi nozzle-type steam trap as is. Here, a case is illustrated in which the drain vent 10 and the intra-drain reservoir conduction port 13-1 are formed at the same height. The positions to dispose these constituent parts in depend on the situation of facilities, however. This is because drain pondage serving as a sealing material is determined by the position of the intra-drain reservoir conduction port of the Venturi nozzle-type steam trap as the result of additionally installing the drainage volume adjusting component 15-2, as is evident from the cross-sectional view of FIG. 7 taken by cutting the steam trap vertically to the page on the dashed line c of FIG. 6. Accordingly, the intra-drain reservoir conduction port 13-1 may be disposed according to a variation in the amount of steam used, a variation in the working pressure difference, or the like that differs depending on facilities.

Then, as illustrated in (a) of FIG. 8 and (a) of FIG. 9 which are cross-sectional views taken by cutting the steam trap vertically to the page on the dashed line d of FIG. 7, the drainage volume adjusting mechanism in the second embodiment can also adjust the discharged amount of condensate in completely the same way as in the first embodiment.

Figure 10:
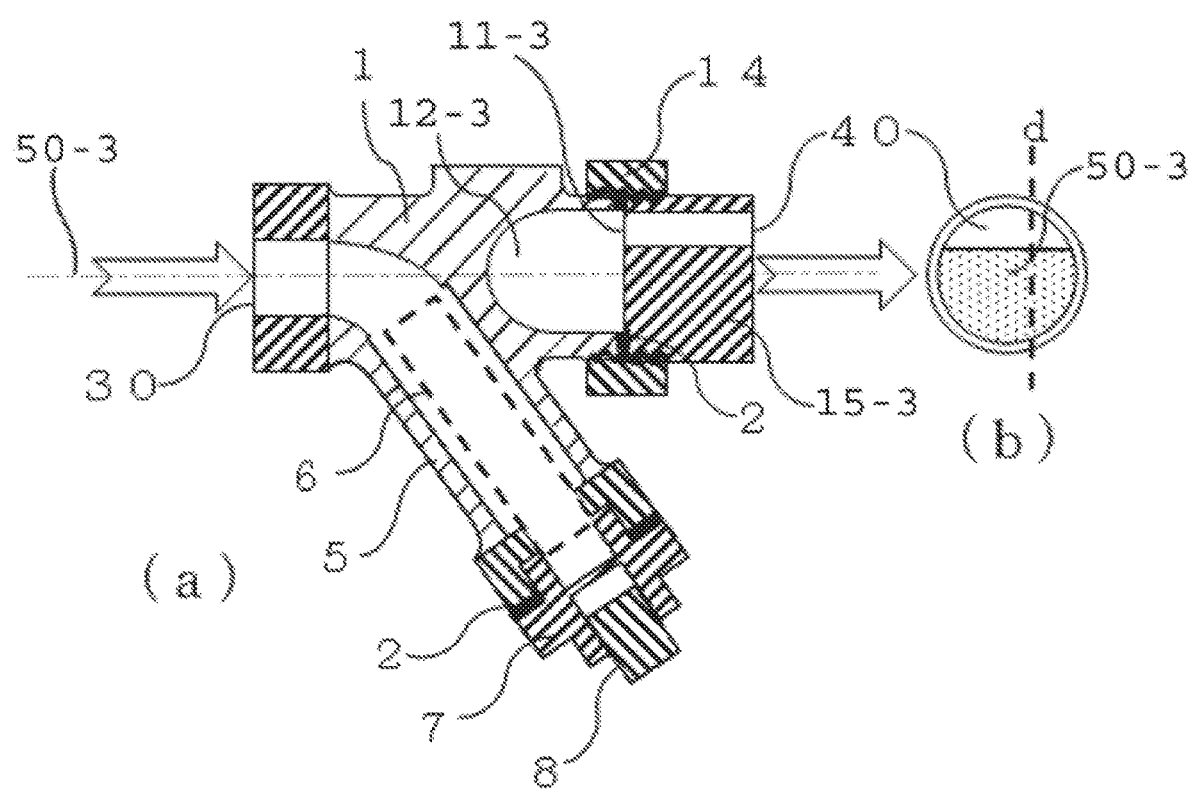
FIG. 10 illustrates the third embodiment of the present invention in which a partition serving as a non-drain vent is disposed in the drainage volume adjusting component and positioned horizontally.
Figure 11:
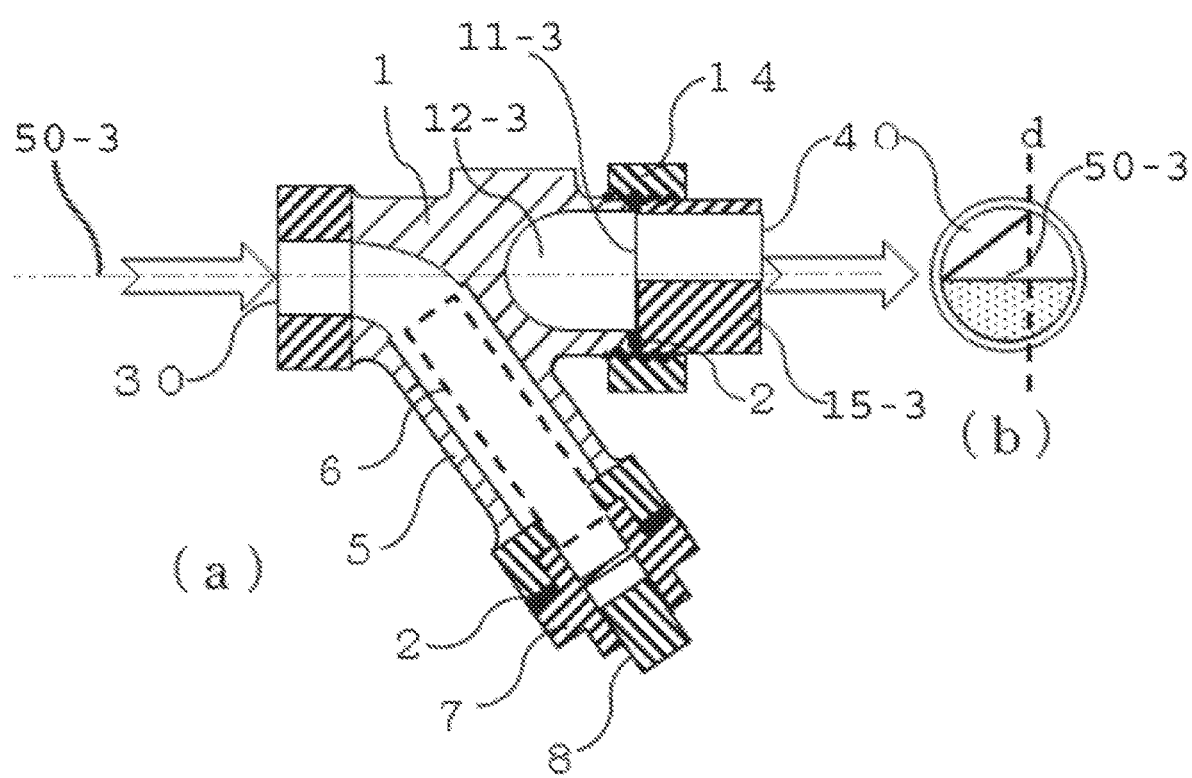
FIG. 11 illustrates the third embodiment of the present invention in which a partition serving as a non-drain vent is disposed in the drainage volume adjusting component and positioned at an angle.

FIGS. 10 and 11 illustrate a third embodiment of the present invention. This steam trap is characterized by additionally attaching a drainage volume adjusting component 15-3 in which the non-drain vent 11-3 is formed using a partition, in contrast to the drainage volume adjusting component 15-2 in which such a non-drain vent 11-2 as illustrated in FIGS. 8 and 9 is formed as a pass-through slot. This steam trap features a modified shape of the non-drain vent 11-2. The non-drain vent 11-3 may have any shapes, as long as the vent serves the same function.

Figure 12:
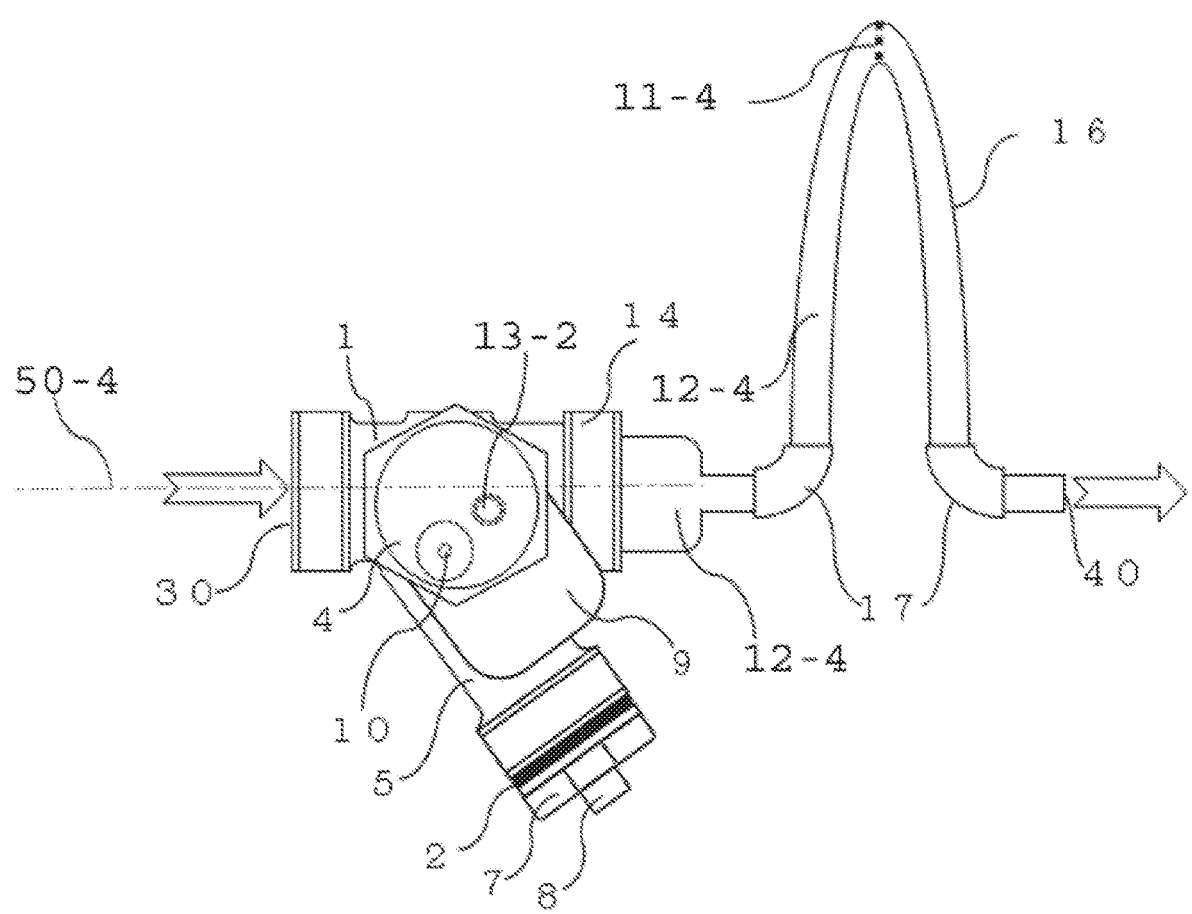
FIG. 12 illustrates a fourth embodiment of the present invention in which a rotatable U-tube is disposed in order to adjust the discharged amount of condensate, and is an external view from which an end cap is removed.

FIG. 12 illustrates a fourth embodiment in which the drainage volume adjusting mechanism of the present invention is also additionally attached to the conventional Venturi nozzle-type steam trap. FIG. 12 illustrates a case in which a drain pondage adjusting U-tube 16 is connected to the vapor transport piping structure by means of a rotatable union 14, flange or the like and an elbow 17 or the like. In this case, the non-drain vent 11 illustrated in FIG. 2 is used as the intra-drain reservoir conduction port 13-2 for connecting drain reservoirs 12-4 in two places and serves as the drain vent 10 illustrated in FIG. 2. In addition, the role of the non-drain vent 11 of the Venturi nozzle-type steam trap illustrated in FIG. 2 functions at the uppermost end 11-4 of the abovementioned U-tube 16 in the present embodiment. That is, this steam trap is a typical example of disposing the non-drain vent outside the cross-sectional area of a pipe provided with the drain reservoirs. The height difference between the intra-drain reservoir conduction port 13-2 and the non-drain vent 11-4 can be continuously varied by rotating the abovementioned U-tube 16 using the union 14. According to this method, the amount of pondage can be set almost unlimitedly by designing the length, thickness, shape and the like of the U-tube, thereby making it possible to cope with the situation of every facility.

Figure 13:
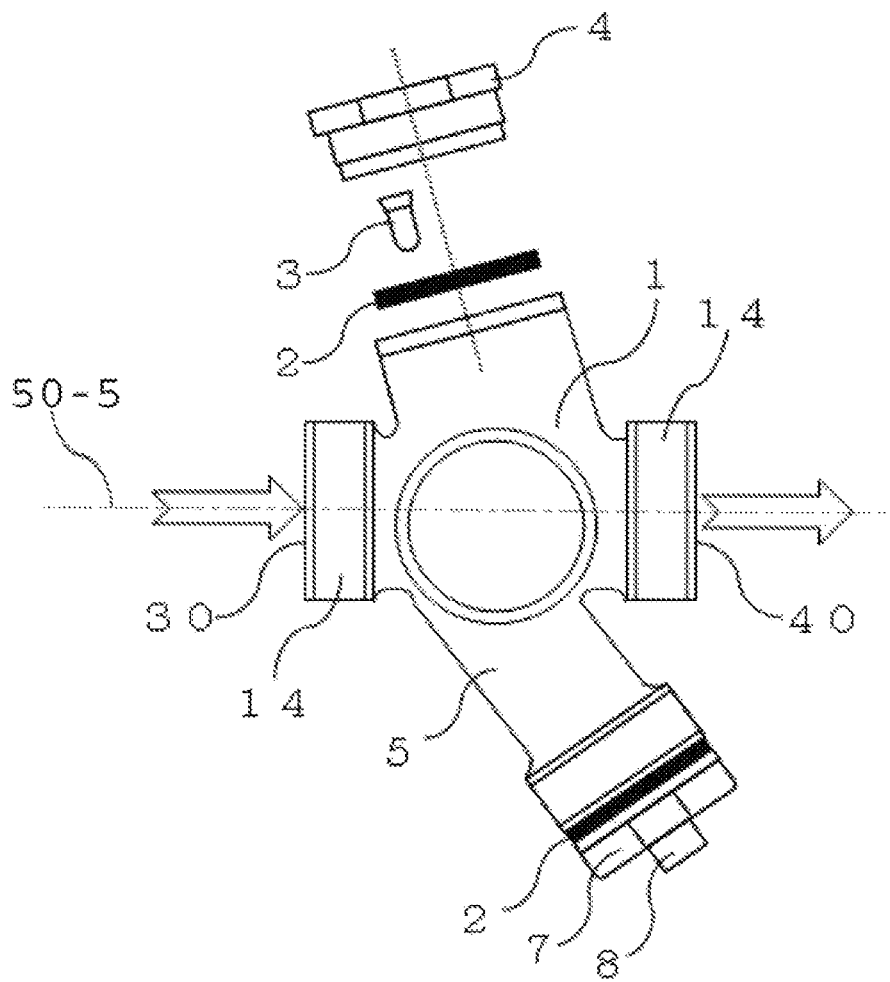
FIG. 13 illustrates a fifth embodiment of the present invention in which a drain reservoir, the drain vent of a Venturi nozzle, and a non-drain vent are rotatably disposed in the upper section of the steam trap, in order to adjust the discharged amount of condensate, and is an external view from which an end cap is removed.
Figure 14:
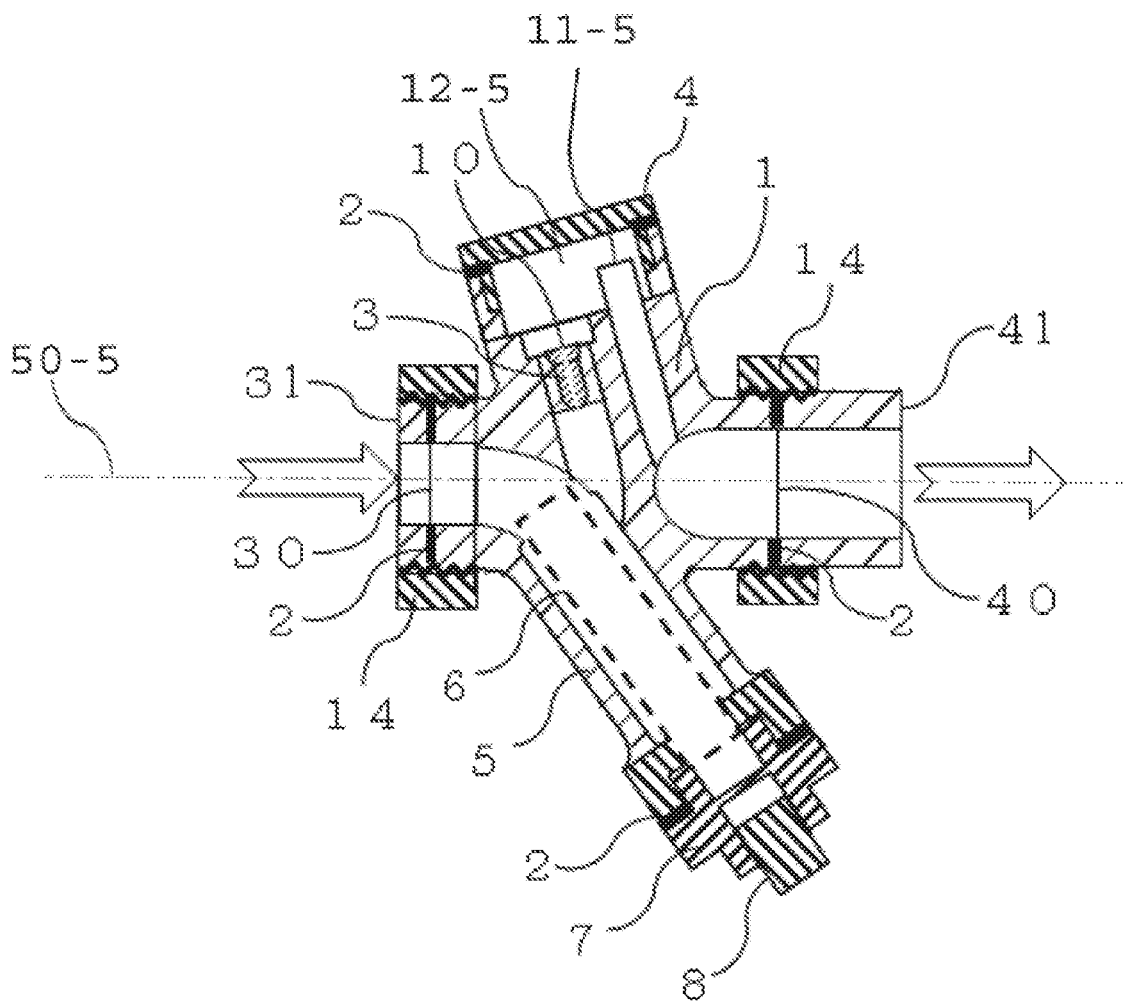
FIG. 14 illustrates the fifth embodiment of the present invention and is a cross-sectional view taken by cutting FIG. 13 parallel to the page.

FIGS. 13 and 14 illustrate a fifth embodiment of the present invention. This steam trap also uses a component including a rotatable non-drain vent 11-5 as a drainage volume adjusting mechanism. The steam trap is characterized, however, in that the drain reservoir 12-5, the drain vent 10 of the Venturi nozzle, and the non-drain vent 11-5 are disposed in the upper section of the steam trap. Also in this case, the body 1 in which the Venturi nozzle 3 is placed in a position lower than the non-drain vent 11-5 is connected to the vapor transport piping structure by means of a rotatable union, flange or the like and the height difference between the drain vent 10 and the non-drain vent 11-5 is continuously controlled by means of rotation to adjust the discharged amount of condensate. This embodiment also has the advantage of being able to simplify and downsize the steam trap.

Figure 15:
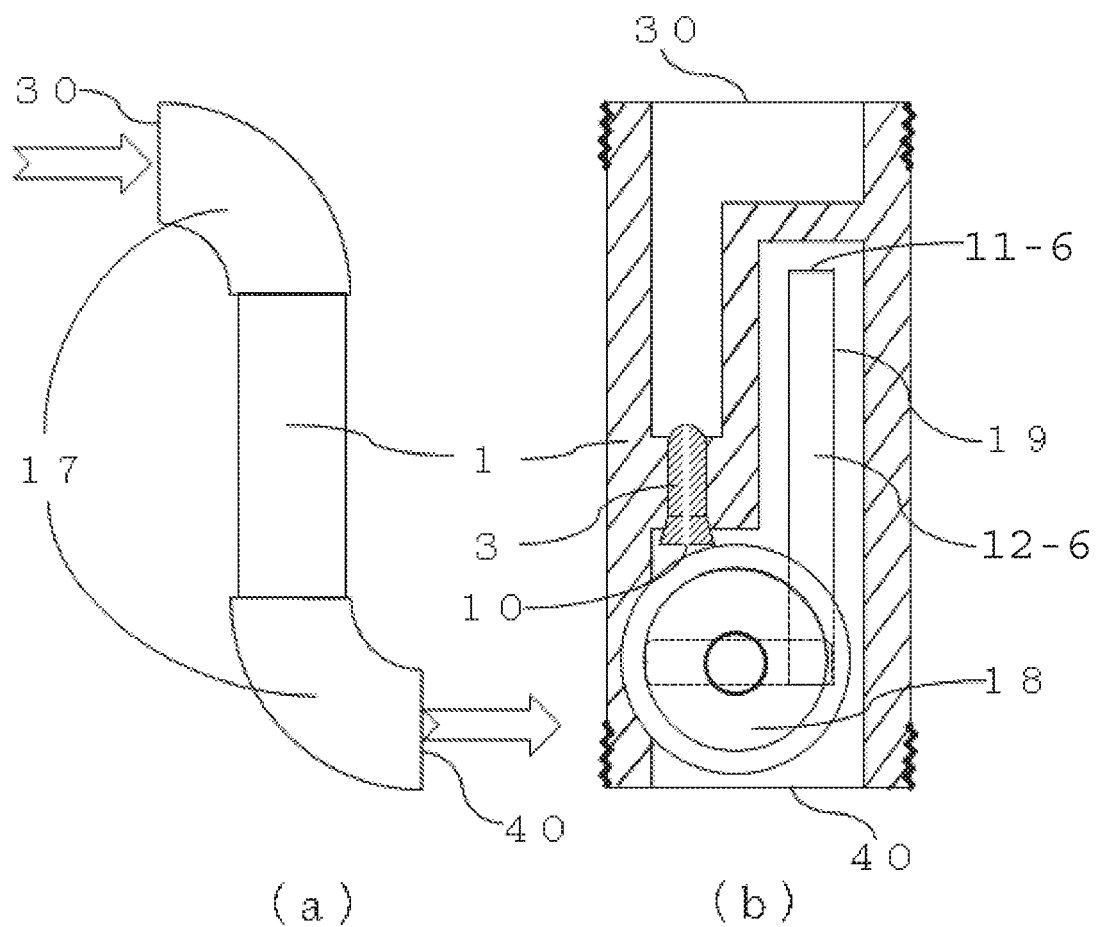
FIG. 15 illustrates a sixth embodiment of the present invention in which a cock and a drain pondage adjusting tube are disposed within the steam trap, in order to adjust the discharged amount of condensate, where (a) of FIG. 15 is an external view of the steam trap, whereas (b) of FIG. 15 is a cross-sectional view taken by cutting a body 1 parallel to the page.
Figure 16:
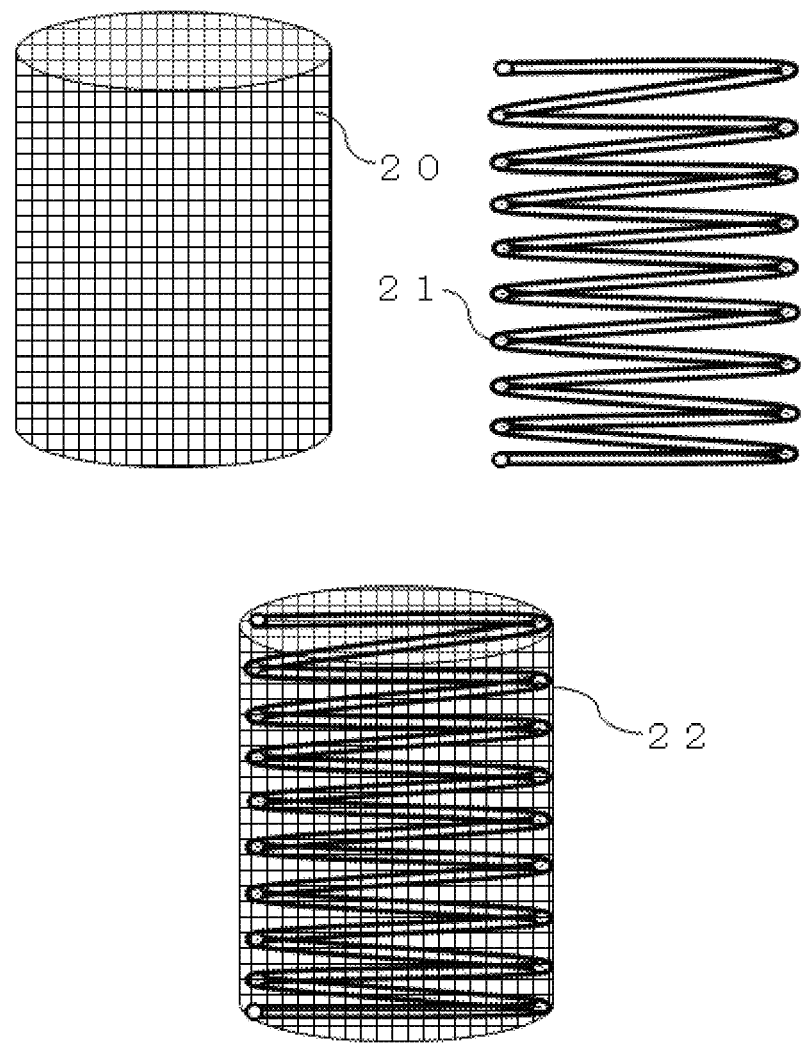
FIG. 16 illustrates a first embodiment of a strainer filter of the present invention.
Figure 17:
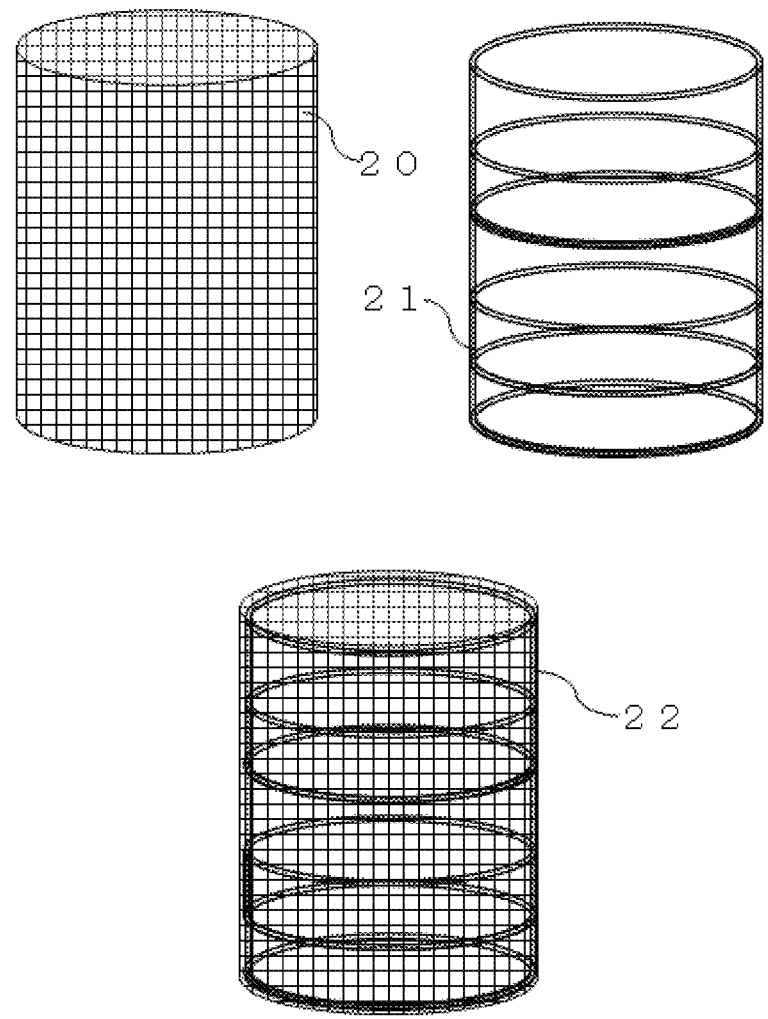
FIG. 17 illustrates a second embodiment of the strainer filter of the present invention.
Figure 18:
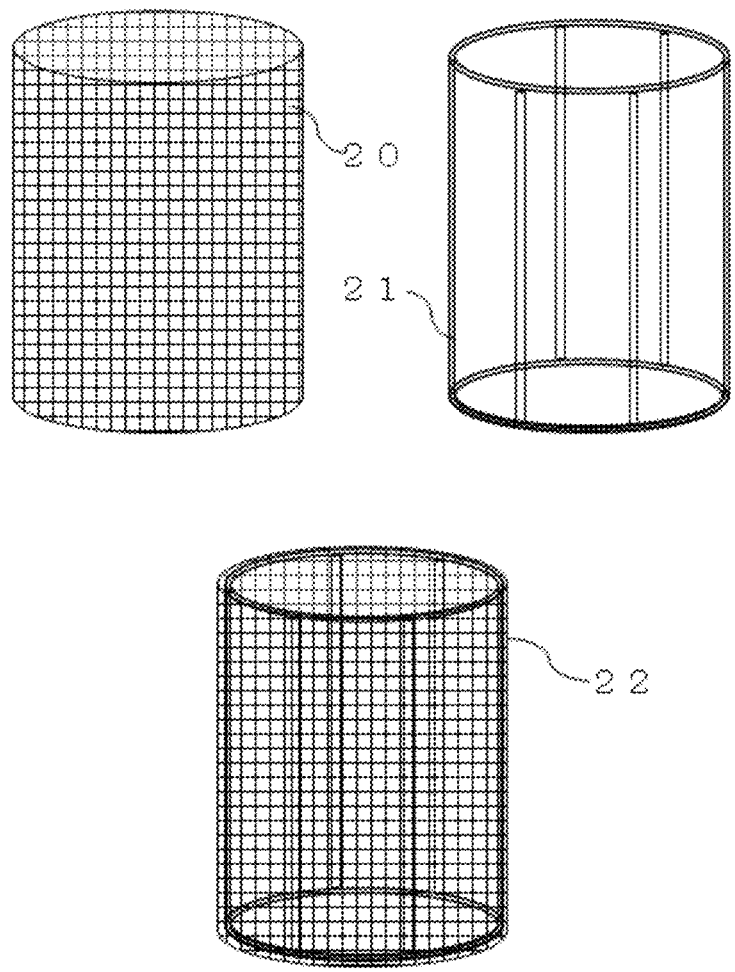
FIG. 18 illustrates a third embodiment of the strainer filter of the present invention.
Figure 19:
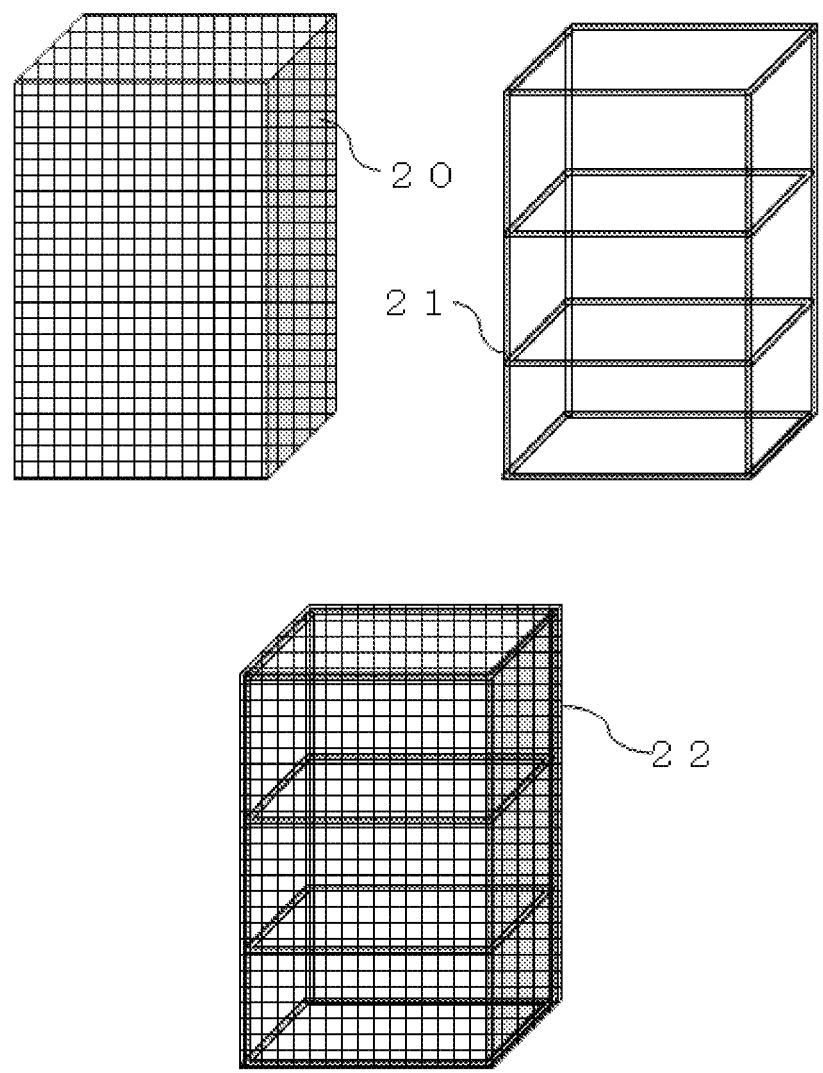
FIG. 19 illustrates a fourth embodiment of the strainer filter of the present invention.

On the other hand, the sixth embodiment illustrated in FIG. 15 realizes the advantage of being able to almost unlimitedly change the discharged amount of condensate offered by the fourth embodiment by means of a completely different drainage volume adjusting mechanism. As is evident from (a) of FIG. 15, the sixth embodiment is first characterized in that the steam trap is vertically positioned, and thus, the steam trap corresponds to the body 1 and is connected to the vapor transport piping structure using the elbows 17. The interior of the body 1 of (a) of FIG. 15 is characterized in that the drain pondage adjusting tube 19 is disposed so that the non-drain vent 11-6 is higher than the drain vent 10, as illustrated in the cross-sectional view of (b) of FIG. 15, and that a drainage volume adjusting mechanism capable of switching between a piping structure in which condensate free-falls and a piping structure in which condensate is transported to the drain pondage adjusting tube 19 using a cock 18 is incorporated. That is, the sixth embodiment is characterized in that the steam trap is vertically piped to enable switching between a piping structure in which condensate discharged from the drain vent 10 is ejected out of the steam trap system in a free-fall state and a piping structure in which the condensate is ejected out of the steam trap system from the non-drain system vent 11-6 higher than the drain vent 10.

Incidentally, such a steam trap as described above is used under severe environmental conditions, and therefore, deterioration-resistant stainless steel has conventionally been recommended for use as the material of the steam trap. Corrosion resistance may have to be taken into consideration, however, depending on a facilities environment. In that case, it is preferable to use austenitic stainless steel (for example, SUS304 or SUS316) or austenitic-ferritic stainless steel (for example, SUS329J3L, SUS329J4L, SAF2507, SAF2707HD or DP28W) superior in corrosion resistance. Workability and cost have to be also taken into consideration, however, to select from these materials, and therefore, SUS304, SUS316, SUS329J3L and SUS329J4L are particularly suitable.

Subsequently, embodiments of the strainer filter of the present invention will also be described by citing a Venturi nozzle-type steam trap as a typical example, while referring to the accompanying drawings. The strainer filter can also be applied, however, to any steam traps, in addition to orifice nozzle-type and tunnel-structured resistance tube-type steam traps.

The diameter of a Venturi nozzle 3 is generally selected from approximately 0.1 mm to 15 mm nozzle diameters in an elaborate manner, according to the operating and environmental conditions of an apparatus. Accordingly, in order for the nozzle not to become clogged with rust or dust within piping, a screen having a mesh opening smaller than at least the nozzle diameter is required. This requirement can be fulfilled with an approximately 300-mesh to 2-mesh (in the case of ASTM standards) screen.

Figure 1:
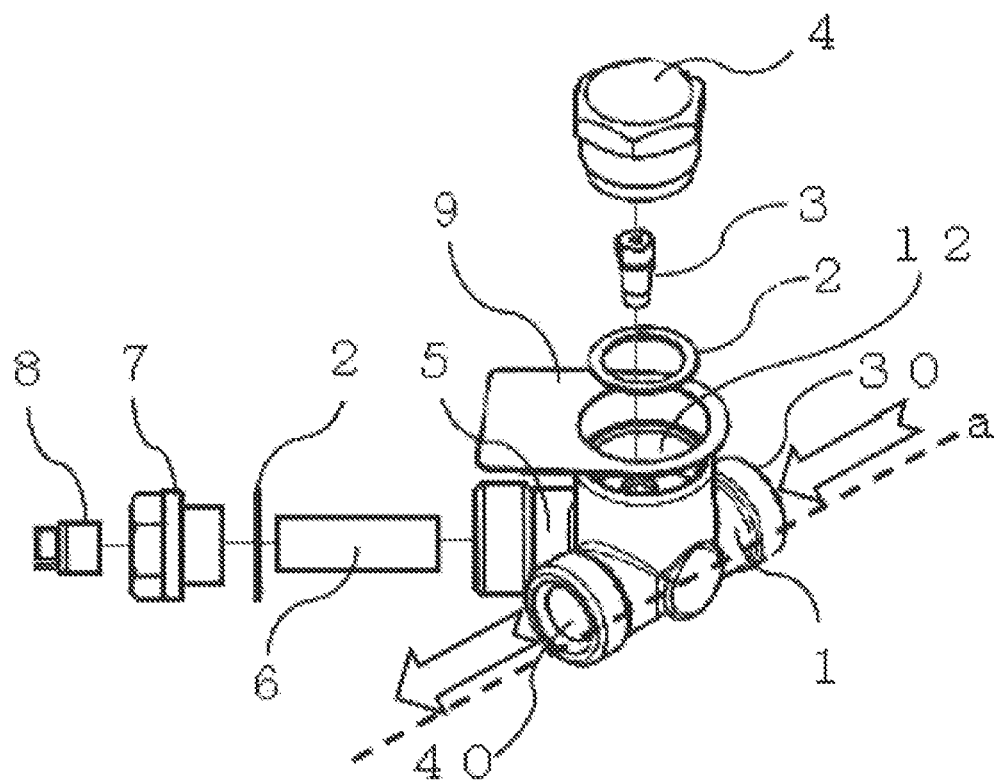
FIG. 1 shows an external view of a conventional Venturi nozzle-type steam trap, in which an arrow is meant to be a flow of steam and/or condensate.
Figure 3:
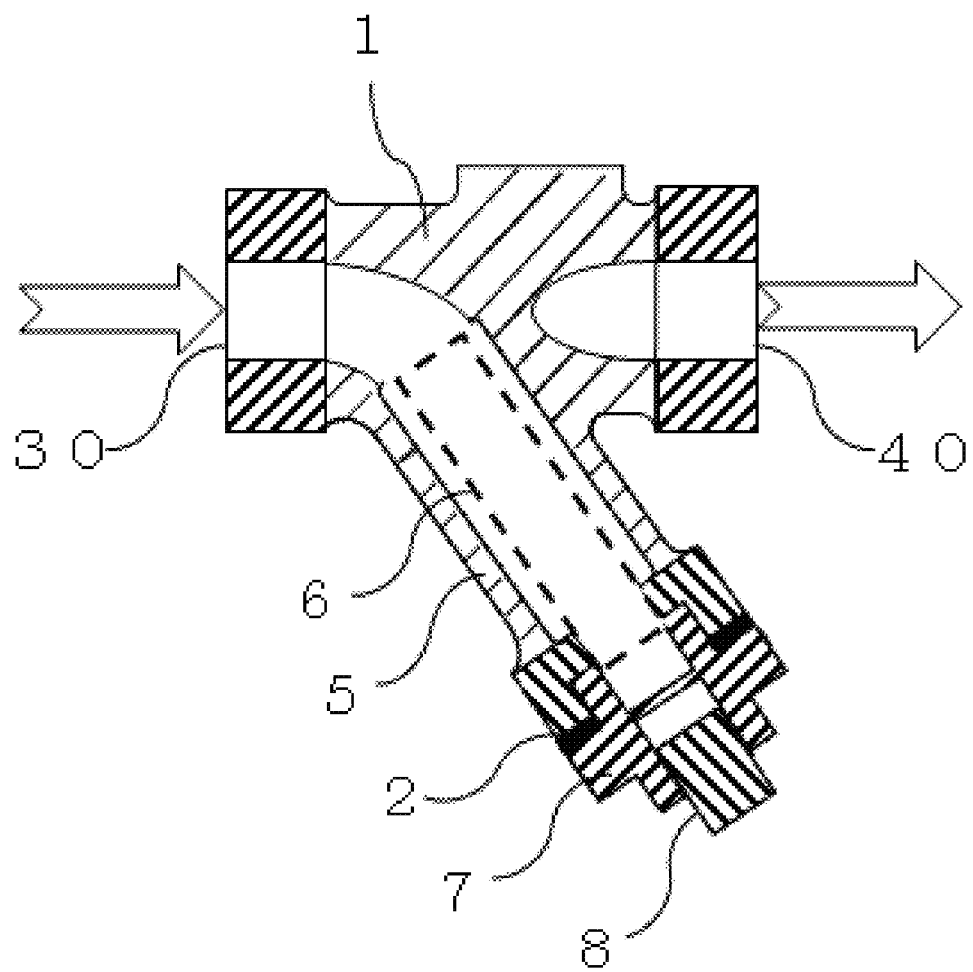
FIG. 3 is a cross-sectional view taken by cutting the steam trap parallel to the page on a dashed line a in FIG. 1.
Figure 4:
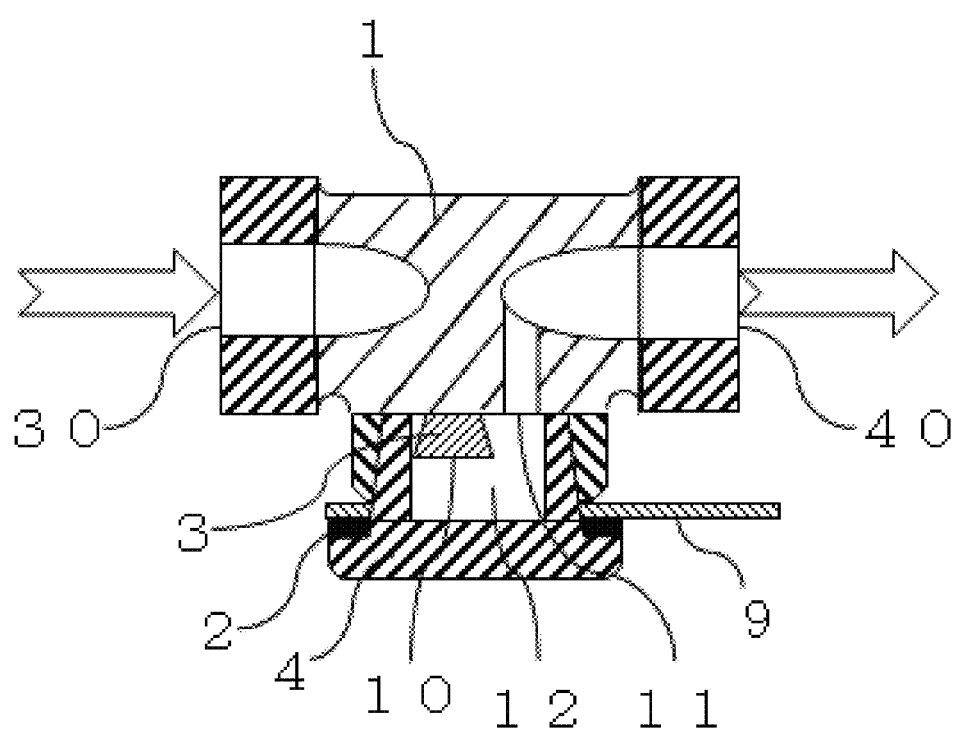
FIG. 4 is a cross-sectional view taken by cutting the steam trap vertically to the page on a dashed line b in FIG. 2.

If an 80-mesh size is exceeded, however, the rigidity of even a metallic screen degrades remarkably. For example, if a cylindrical screen 6 is directly attached to such a Y-shaped strainer 5 as illustrated in FIGS. 1 to 3, the screen becomes deformed during operation. In the case where strainer maintenance for reasons of, for example, the clogging of the screen is performed, such deformation easily takes place when the screen is attached or detached. In addition, the screen, if not carefully cleaned, easily becomes deformed or broken. On the other hand, applying a screen made of heat-resistant fiber is advantageous from the view point of cost and molding workability. The screen is not usable, however, since the screen larks rigidity irrespective of its mesh size.

Hence, the abovementioned problem is eliminated by reinforcing the screen with a rigid support body as illustrated in, for example, FIGS. 16 to 19. In addition, the size of the screen can be freely adjusted in conformity with the size of the strainer 5. Although FIGS. 16 to 19 illustrate a filter in which a support body 21 is reinforced, from inside of a screen 20, the support body 21 may be reinforced from outside of the screen 20.

The material of such a screen 20 as mentioned above is not limited. Since the screen is used in high-temperature steam containing impurities, such as rust, however, it is preferable to use metal, such as iron, nickel, chromium, titanium, zinc, copper, aluminum, or an alloy thereof, in consideration of heat resistance, joining properties, rigidity, corrosion resistance, and the like. Incorporating the abovementioned support body 21 enables use of a heat-resistant fiber superior in cost and workability. Glass fiber, aramid fiber, polyether ether ketone, or the like is preferably used as this heat-resistant fiber. Among these materials, stainless steel, such as SUS304 or SUS316, is most preferred from the viewpoint of corrosion resistance, molding workability, cost, and the like. The screen can have a mesh structure, including a woven mesh, a punched mesh, an electroformed mesh, an etched mesh and a non-woven fiber mesh, according to the material. In addition, the aperture shape of the screen is not limited in particular, but may be a circle, an ellipse, a quadrangle, a rhomboid, or the like.

The material of the support body 21 for reinforcing the screen 20 is not limited in particular, either. Like the screen, however, it is preferable to use metal, such as iron, nickel, chromium, titanium, zinc, copper, aluminum, or an alloy thereof, in consideration of heat resistance, joining properties, rigidity, corrosion resistance, and the like. Stainless steel is suitable in particular. As illustrated in FIG. 7, such a structure of the support body 21 as to offer the performance advantages of springs is most preferable in solving the problems of a conventional screen.

The above-described screen 20 and support body 21 are integrated with each other by means of joining together, coupling with each other, screwing together, engaging with each other, sewing together, or mating with each other, though the method of integration differs depending of a material used. Welding is preferred if metallic materials are integrated with each other. If the screen is made of synthetic resin, the screen and the support body can be joined together by means of thermal fusion bonding.

The screen and the support body may be joined together using an adhesive agent. A heat-resistant adhesive agent is required, however, as in the case of the screen and the support body described earlier. A polyimide-based adhesive agent, for example is preferably used.

Figure 20:
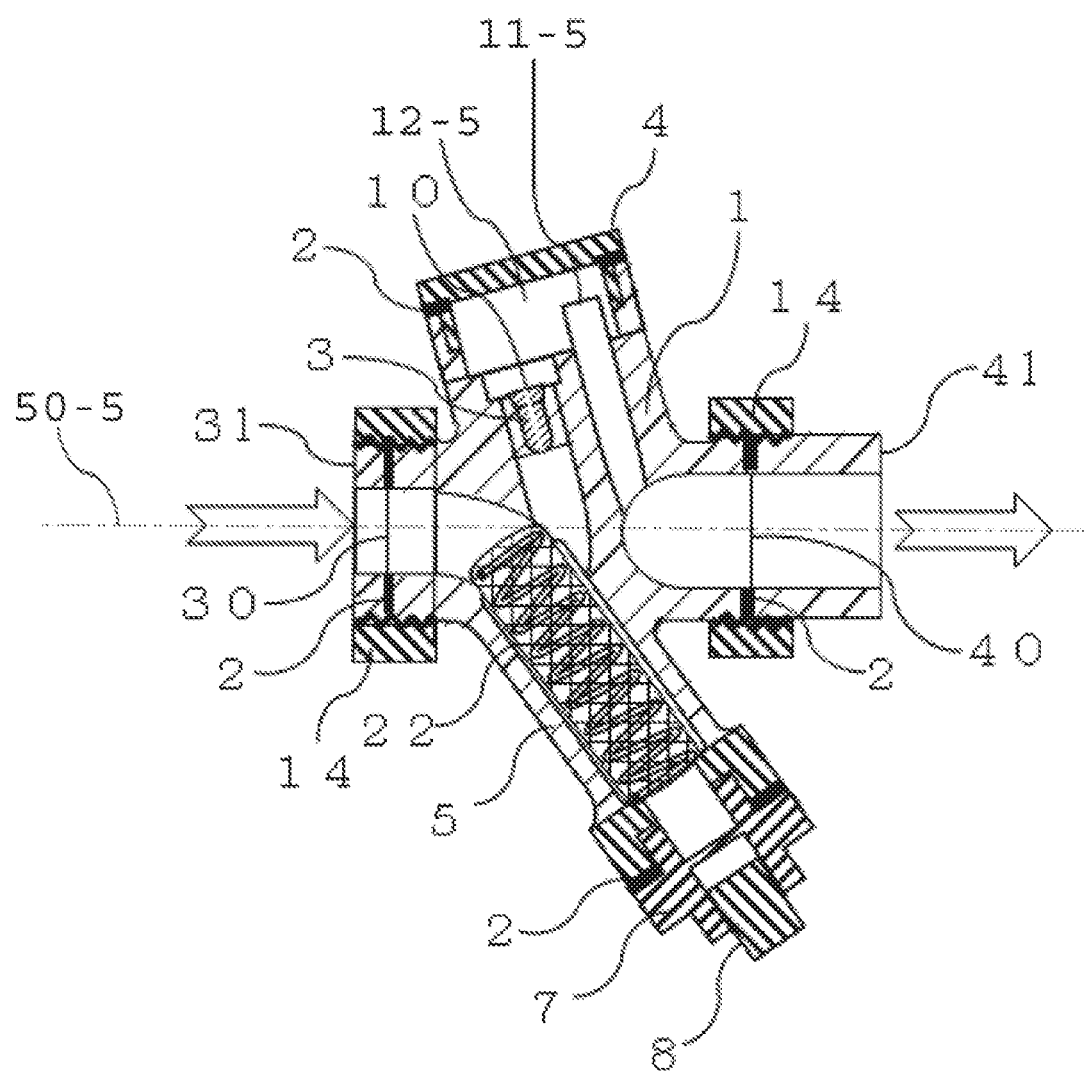
FIG. 20 illustrates one embodiment of a Venturi nozzle-type steam trap of the present invention including a drainage volume adjusting mechanism provided with a strainer filter, and is an example in which the strainer filter of the present invention illustrated in FIG. 16 is applied to a Venturi nozzle-type steam trap including the drainage volume adjusting mechanism of the present invention illustrated in FIGS. 13 and 14.

FIG. 20 illustrates one embodiment to which a strainer filter of the present invention is specifically applied. This embodiment has been implemented by applying the strainer filter to a nozzle-type steam trap including a drainage volume adjusting mechanism capable of adjusting and optimizing the discharged amount of condensate without the need for exchanging the Venturi nozzle 3 for another. FIG. 20 is a cross-sectional view of the steam trap. As is evident from the figure, the steam trap has an extremely simple structure in which the position of the non-drain vent 11-5 can be moved up and down by means of rotation using a union 14 to adjust the discharged amount of condensate. In addition, a filter 22 for preventing the clogging of the Venturi nozzle 3 can be easily attached to the steam trap, and the rigidity of a screen is reinforced with a support body. The screen therefore does not become damaged. Yet additionally, such reinforcement enables the screen to be easily cleaned, and the size of the filter can be changed freely.

INDUSTRIAL APPLICABILITY

A nozzle-type steam trap of the present invention including a drainage volume adjusting mechanism characterized by a piping structure in which the height difference between a drain vent and a non-drain vent is variable and a strainer filter suited for the steam trap have been described with respect to the discharge of condensate in the steam piping structure of equipment including a boiler and the like. From the viewpoint of the discharge of condensate liquids in gas flow piping, however, the steam trap and the strainer filter can be applied to not only water vapor systems but also gas piping systems of all sorts.

REFERENCE SIGNS LIST

1: Body
2: Gasket
3: Venturi nozzle
4: End cap
5: Strainer
6: Screen
7: Strainer end cap
8: Steam plug
9: Nameplate
10: Drain vent
11: Conventional fixed non-drain vent
11-6: Another fixed non-drain vent
11-1: First rotatable non-drain vent
11-2: Second rotatable non-drain vent
11-3: Third rotatable non-drain vent
11-4: Fourth rotatable non-drain vent
11-5: Fifth rotatable non-drain vent
12: Conventional drain reservoir
12-1: First drain reservoir
12-2: Second drain reservoir
12-3: Third drain reservoir
12-4: Fourth drain reservoir
12-5: Fifth drain reservoir
12-6: Sixth drain reservoir
13-1: First intra-drain reservoir conduction port
13-2: Second intra-drain reservoir conduction port
14: Union (Rotatable component)
15-1: First drain volume adjusting component
15-2: Second drain volume adjusting component
15-3: Third drain volume adjusting component
16: Drain pondage adjusting U-tube
17: Elbow
18: Cock
19: Drain pondage adjusting tube
20: Screen
21: Support body
22: Strainer filter
30: Inlet of steam and/or condensate
31: Inlet pipe line of steam and/or condensate
40: Outlet from steam trap of steam and/or condensate
41: Outlet pipe line of steam and/or condensate
50-1: First rotatable axis
50-2: Second rotatable axis
50-3: Third rotatable axis
50-4: Fourth rotatable axis
50-5: Fifth rotatable axis

The invention claimed is:

1. A Venturi nozzle steam trap comprising:
a body connected to an outlet of steam and/or condensate and an inlet of steam and/or condensate;
a strainer disposed in the body;
a drain reservoir annexed to the body; and
a Venturi nozzle installed in the steam trap,
wherein
the drain reservoir is disposed in an upper section of the steam trap and is arranged at a top of the body,
the drain reservoir includes a drain vent of the Venturi nozzle through which condensate is discharged into the drain reservoir disposed in the steam trap and a non-drain vent through which condensate is discharged from the drain reservoir to an outer side of the steam trap through the outlet of steam and/or condensate,
the drain vent is placed in a position lower than the non-drain vent,
the body is connected to a vapor transport piping structure by using a rotatable and connectable union or flange on a same axis as that of the vapor transport piping structure,
a distance between the axis and the drain vent is arranged to be shorter than that between the axis and the non-drain vent, and
a difference between the vertical height, relative to the axis, of the drain vent and that of the non-drain vent is varied by rotating the body on the axis with the union or flange to adjust a discharged amount of condensate.

2. The Venturi nozzle steam trap according to claim 1, further comprising a strainer filter composed of 2-300 mesh screen.

3. The Venturi nozzle steam trap according to claim 2, wherein the strainer filter is composed of 100 to 300 mesh screen reinforced with a support body.

* * * * *